United States Patent [19]

Schairer

[11] 4,040,563
[45] Aug. 9, 1977

[54] SYSTEM AND METHOD OF MONITORING THE PEAK TEMPERATURE OF A MOVING MASS

[75] Inventor: James Alfred Schairer, Richmond, Ind.

[73] Assignee: Johns-Manville Corporation, Denver, Colo.

[21] Appl. No.: 633,529

[22] Filed: Nov. 19, 1975

[51] Int. Cl.² .......................... C03B 5/24; G01J 5/02
[52] U.S. Cl. .............................. 236/15 BC; 65/162; 73/355 R; 236/DIG. 15; 250/347
[58] Field of Search ............... 65/162; 73/351, 355 R, 73/355 EM; 236/15 BC, 15 BR, DIG. 15; 250/347; 219/502

[56] References Cited
U.S. PATENT DOCUMENTS

| 3,101,618 | 8/1963 | Hance | 73/355 R |
| 3,257,188 | 6/1966 | Morgan et al. | 236/15 BC |
| 3,696,678 | 10/1972 | Mossey | 73/351 |

Primary Examiner—William E. Wayner
Attorney, Agent, or Firm—Robert M. Krone; Joseph J. Kelly

[57] ABSTRACT

Monitoring the peak temperature of a moving mass, such as a flowing stream of molten material, has in the past been plaqued with problems. The present system and method overcomes these problems by oscillating a temperature sensor, spaced from the moving mass, such that the sensor scans back and forth across the moving mass during each cycle of oscillation. The output signal from the sensor is fed to device that preferably puts out a signal proportional to the peak temperature sensed by the sensor on each half cycle of oscillation, which output signal is caused to decay at a desired rate between peak temperature measurements. This slightly sawtooth shaped output signal can be recorded and/or used for control purposes.

7 Claims, 5 Drawing Figures

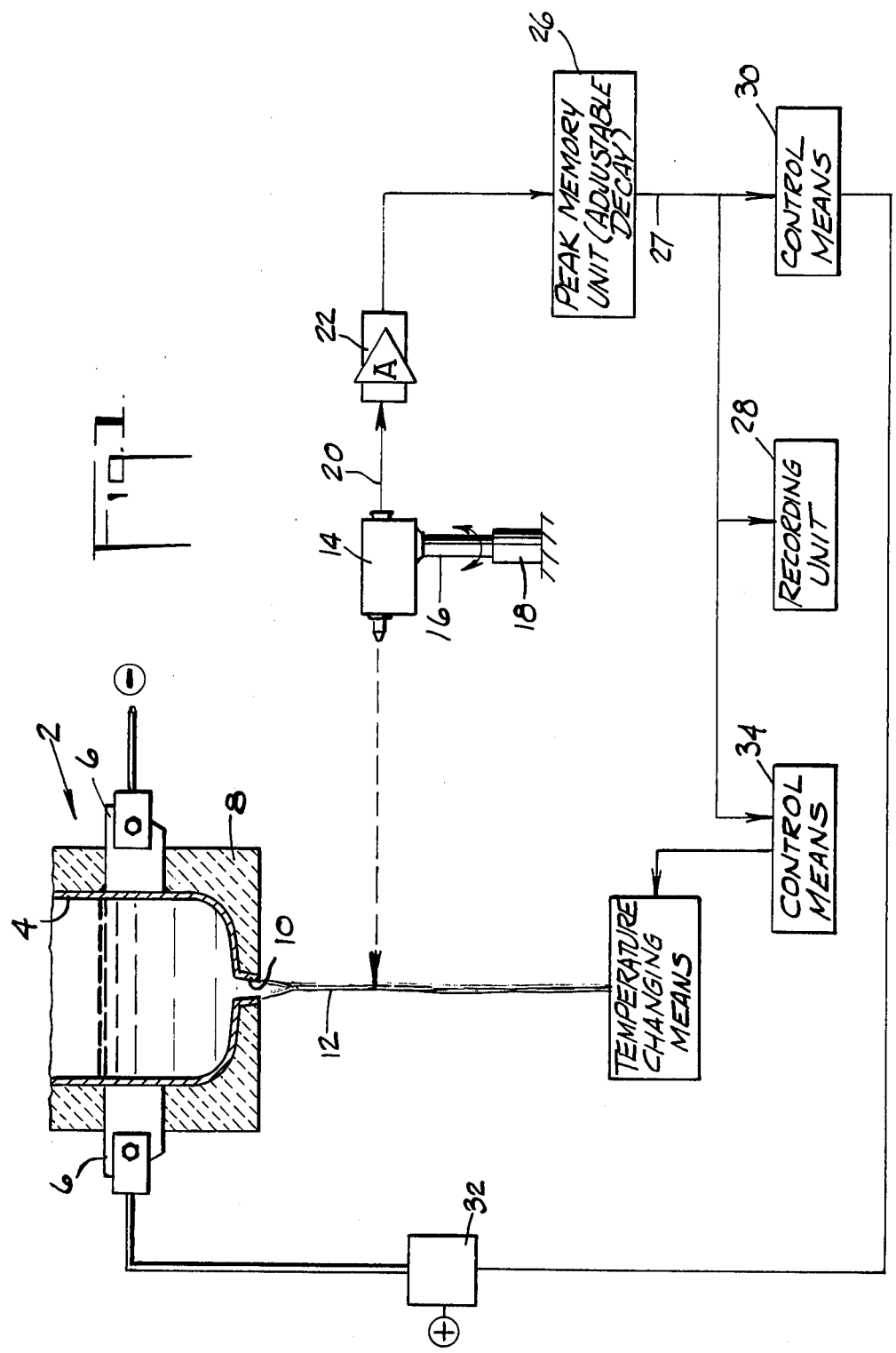

4,040,563

SYSTEM AND METHOD OF MONITORING THE PEAK TEMPERATURE OF A MOVING MASS

BACKGROUND OF THE INVENTION

In the past, monitoring of the temperature of a moving mass, such as a flowing stream of molten material, has been plagued with problems. Placing a contact temperature sensing device, such as a thermocouple, into the stream alters the flow of the material and is eroded by the moving corrosive mass. When the moving mass is a solid object, placing a device such as a thermocouple in contact with the moving mass results in rapid abrasive wear.

Attempts have been made to mount radiation pyrometers spaced from the flowing mass and sited onto the approximate center or centerline of the flowing mass. The problems with this technique are; (1) the centerline of the moving mass often moves with respect to the sensor, (2) the peak temperature of the mass is not always coincident with the centerline of the flowing mass, and (3) vibrations from surrounding equipment cause the radiation pyrometer to move such that the pyrometer is not always sited on the centerline. When any one of these conditions occur, the output signal will be effected, even though the peak temperature of the flowing mass may have remaining constant. Furthermore, there is no way of determining whether or not the change in output signal is due to one of the above conditions or due to a change in the peak temperature of the moving mass.

It is desirable to have accurate and fairly continuous information on the peak temperature of a moving mass where the temperature of that moving mass is critical to subsequent processing steps and apparatus so that changes can be made either in the apparatus used to heat the moving mass or to subsequent apparatus to compensate for deviations from the desired temperature. Thus the object of the present invention is to provide a method and a system for monitoring the peak temperature of a moving mass in such a manner that the problems mentioned above are overcome.

BRIEF SUMMARY OF THE INVENTION

The present invention provides a method for monitoring the peak temperature of a mass moving past a given area wherein the peak temperature changes location within the confines of said mass adjacent to said area. The method comprises locating means for sensing the temperature of a portion of said mass, which portion is located adjacent to a segment of the area at a distance from the moving mass wherein the temperature sensing means emits a first signal having a magnitude representative of the temperature of the portion of the mass, the first output signal comprising peaks and valleys and magnitude or voltge differences therebetween, oscillating the temperature sensing means such that the segment of the area adjacent to the portion of the mass on which the temperature sensing means is sited is swept back and forth across the area adjacent to the moving mass, and feeding the first signal to receiving means for generating a second signal relating to at least the peak magnitude of that portion of the first signal received during each half cycle of oscillation, the receiving and generating means also having means for decaying the magnitude of the second signal at a desired rate between the times that the peak temperatures are sensed in sequential half cycles of oscillation by the sensing means, the second signal also having peaks and valleys and magnitude or voltage differences therebetween, but the magnitude or voltage differences of the second signal being much smaller than the corresponding magnitude or voltage differences of the first signal. Preferably the first signal is fed to a linear converting means for converting the signal from being only related to the sensed temperature to being linearally proportional to the sensed temperature. The second output signal can be used to record a semi-continuous peak temperature of the moving mass and can also be used along with conventional control equipment to control the apparatus heating the moving mass and/or to control subsequent apparatus to compensate for any deviations in temperature from the desired temperature of the moving mass.

The present invention further provides a system for monitoring the peak temperature of a mass moving past a given area wherein the peak temperature changes locations within the confines of the mass and of the area comprising means for sensing the temperature of a portion of the mass located adjacent to a segment of the area, the sensing means being spaced from the mass and capable of emitting a first signal having a magnitude representative of the temperature of the mass at the portion, the first signal comprising peaks and valleys and magnitude or voltage differences therebetween, means for oscillating the sensing means and thereby oscillating the segment of the area within the confines of the area, means for receiving the first signal and for generating a second signal that relates to at least the peak magnitude of that portion of the first signal received during each half cycle of oscillation, the receiving and generating means also having means for decaying the magnitude of the second signal at a desired rate between the times that the peak temperatures are sensed in sequential half cycles of oscillation by the sensing means, the second signal having peaks and valleys and voltage differences therebetween, but the voltage differences of the second signal being much smaller than the corresponding voltage differences of the first signal. The differences between the magnitudes of the peaks and valleys of the first and second signals need not always be voltage differences. Where the sensing means emits a signal other than voltage relative to the temperature sensed, e.g. amperage, the differences between the peaks and valleys would be amperage differences, etc.

BRIEF DESCRIPTION OF THE DRAWINGS

FIG. 1 is a schematic showing the system of the present invention.

DETAILED DESCRIPTION AND PREFERRED EMBODIMENTS

Figure 3:
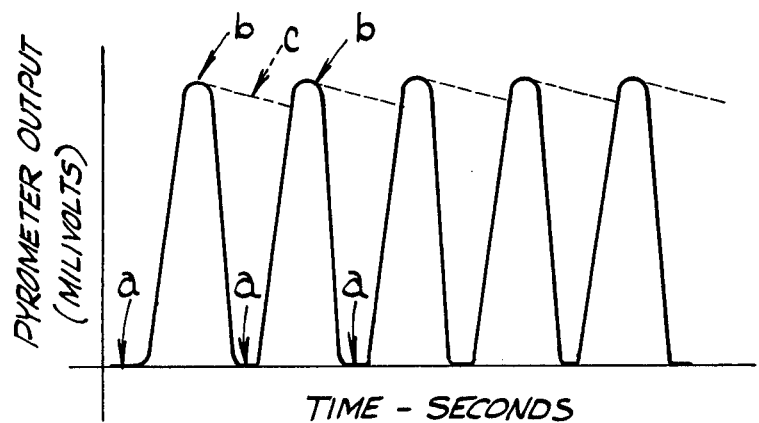
FIG. 3 is a graph of the amplitude of the first output signal versus time.

FIG. 1 illustrates a typical application of the present invention. A conventional furnace 2 having a metal lining 4, such as a platinum/rhodium alloy, which is electrically heated by its own resistance by passing a current through lugs 6 which are conductively connected to the lining 4. A thermal insulation layer 8 surrounds the metal lining 4. Any material capable of being melted can be melted in the furnace 2, or the furnace 2 can be used to further heat previously melted material. Molten material is fed out of the furnace through an orifice 10 and falls by gravity in a stream 12. It is usually desirable to control the temperature of the stream 12 by adjusting the amount of current fed to the lugs 6. To accomplish this it is necessary to continuously or semi-continuously monitor the temperature of the stream 12.

Figure 2:
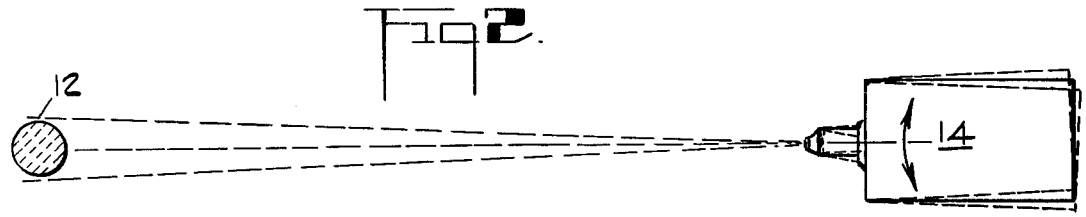
FIG. 2 is a plan view showing the field of view of a temperature sensing means upon being oscillated.

Monitoring the temperature of the moving mass 12 is accomplished in the present invention by locating a temperature sensing means 14 at a distance spaced from the moving mass 12. Preferably, the temperature sensing means is a conventional infrared radiation pyrometer. The pyrometer 14 is mounted on a shaft 16 by any suitable means which shaft is oscillated about its axis by a conventional reversing motor 18. The reversible motor 18 has adjustable stops and/or reversing such that the degree of oscillation can be adjusted according to the size of the target 12 and the distance that the pyrometer 14 is spaced from the target 12. Also, an eccentric can be attached to a small motor and used to drive the shaft with an off center linage like an oscillating room fan. Any other suitable means of oscillating can also be used. Referring to FIG. 2, it is preferably to adjust the degrees of oscillation such that the optical pyrometer 14 scans back and forth across the entire moving mass and preferably just slightly beyond on either side to accommodate any normal fluctuations in the cross-sectional dimension of the moving mass.

The optical pyrometer 14 normally sees only a small segment of the target. The area of the segment will vary depending upon how far the pyrometer 14 is spaced from the target 12. Oscillating the pyrometer 14 in the manner described above in effect moves this small segment back and forth across the confines of the moving mass 12 and slightly beyond on either side.

The radiation pyrometer 14 emits a first signal 20 having a magnitude relating to the temperature of that portion of the target adjacent to the small segment which the optical pyrometer sees at that instant. The signal 20 is fed to an amplifier 22 for amplification and then preferably to a linear convertor 24 which converts the magnitude of the signal 20 to a signal whose magnitude is linearlly proportional to the temperature sensed by the radiation pyrometer 14. The linear convertor 24 are optional as shown by the phantom lines in FIG. 1.

FIG. 3 shows a graph of the magnitude of a typical first signal 20 plotted versus time. When the segment seen by the optical pyrometer 14 is outside the confines of the moving mass 12 it usually sees nothing emitting any significant radiation and therefore the amplitude of the signal drops to essentially zero as shown in the valleys a of FIG. 3. As the segment seen by the pyrometer 14 is moved to the edge of and into the moving mass 12 the temperature sensed rises rapidly to a peak temperature b which is the hottest portion of the moving mass and usually is located somewhere in the center portion of the moving mass. As the pyrometer and the segment it sees continue to completion of a half cycle of oscillation, the temperature falls from the peak temperature rapidly. When the segment moves outside of the confines of the moving mass on the other side, the magnitude of the signal again drops to essentially zero or another valley a.

Such an erratic signal would not be satisfactory as an input to either a control means or a recording unit. To convert this signal to a meaningful signal that is suitable as an input to a controller and/or a recording unit, this signal is fed into a peak memory unit 26 having an adjustable decay capability. Such devices are available on the market, e.g. a PEAK PICKER available from IRCON, INC. or a THERMALERT SL-400 available from RAYTEK, a division of Optical Coating Laboratory, Inc.

The peak memory unit 26 emits a second signal 27, the magnitude of which includes the peak temperature sensed by the sensing means 14 on each half cycle of oscillation. Between maximum magnitude impulses in the first signal, i.e. peak temperatures sensed during each half cycle of oscillation, the second signal is caused to decay at a predetermined rate by the peak memory unit 26 so that if the peak temperatures sensed during the next half cycle of oscillation are less than the peak temperatures sensed in the previous half cycle of oscillation it will be reflected in the second signal, unless the temperature of the moving mass has dropped faster than the predetermined decay rate. The latter occurrence would normally not happen because the decay rate is predetermined to permit the system to monitor normally expected fluctuations in the temperature of the moving mass. Features for accommodating unexpected changes in the temperature of the moving mass 12 will be described later.

Figure 4:
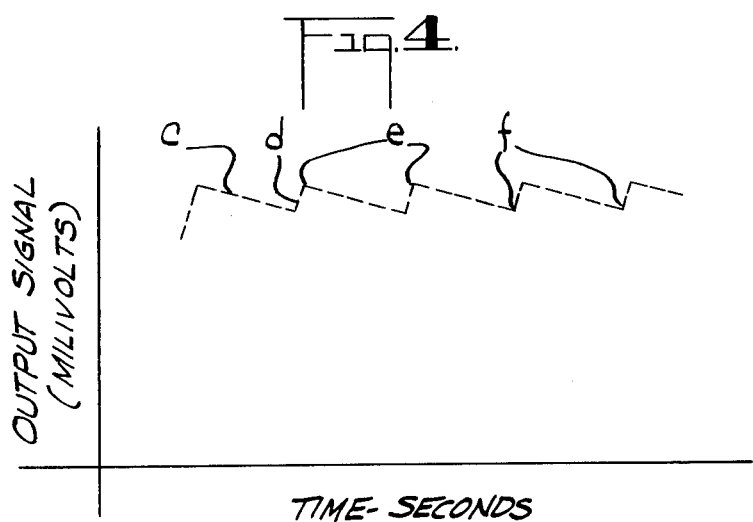
FIG. 4 is a graph of the amplitude of the second output signal versus time.
Figure 5:
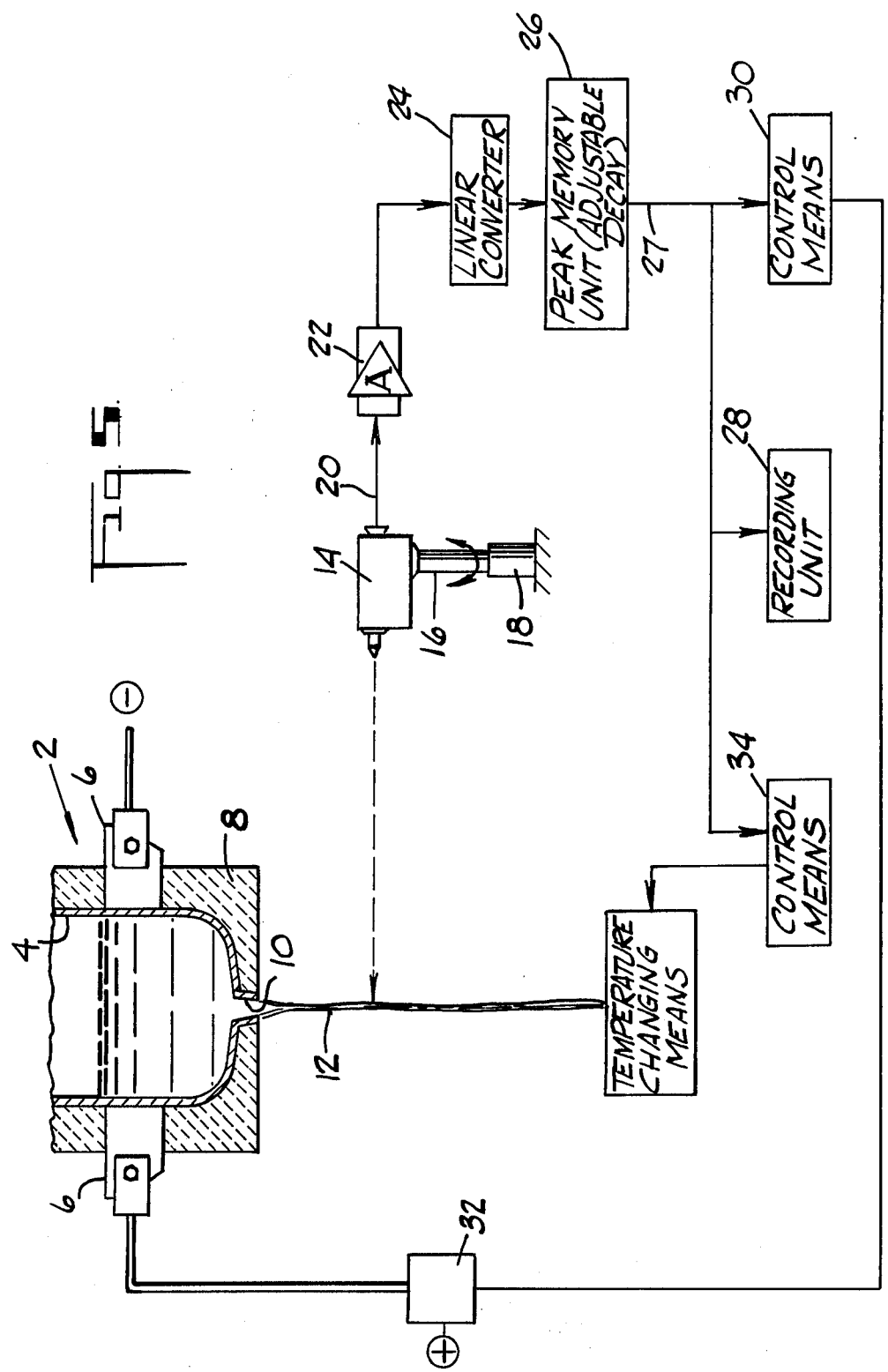
FIG. 5 is a modified schematic similar to FIG. 1 and provided with a linear converter.

A typical decay rate is indicated by the dash lines c in FIG. 3. A typical second signal emitted from the peak memory unit 26 is shown in FIG. 4. Note that that portion of the first signal generated during each half cycle of oscillation that is higher in magnitude than the decayed second signal emitted from the peak memory unit 26 will be immediately reflected in the second signal as evidenced by the slope d of the signal shown in FIG. 4. These characteristics result in a second signal having a sawtooth shape when the amplitude of the signal is plotted versus time. The magnitude differences between the peaks e of the second signal and the valleys f of the second signal are much less than the magnitude differences between the corresponding peaks b and the valleys a of the first signal, and are sufficiently insignificant that they can be effectively dampened out by conventional control means and recording means.

The second signal, which now represents an accurate and meaningful essentially continuous or semi-continuous representation of the temperature of the moving mass 12, can be used in various ways. For example, it can be fed to a conventional recording unit to provide a record of the temperature over a particular period of time to show trends of the process, and this information can be used immediately by an operator to make appropriate adjustments, or at a later time. Also, the second signal can be fed to conventional control means 30 such as an analog controller which in turn can adjust the current being fed to the lugs 6 to maintain the temperature of the moving mass at a desired set point. For example, this might be done using a conventional current regulating means 32 such as a motorized rheostat. The control means would adjust the motor setting on the rheostat to in turn regulate the amount of current fed to the lugs 6 in response to the temperature of the moving mass as determined by the system described above. In the system illustrated in FIG. 1 the current regulating means 32 is connected in series with a power source and the resistance heated furnace unit 4 and lugs 6.

The second signal can also be used in connection with a control means 34, which can be identical to the control means 30, to control subsequent equipment in the process to compensate for changes in the temperature of the moving mass 12, such as conventional temperature changing means 36, i.e. conventional heating or cooling means.

Although the invention is described above as being used with a flow of molten material, particularly molten glass, the invention could be used with any essentially continuous moving mass hving a temperature that could be sensed by a temperature sensing means spaced from the moving mass. The oscillation rate of the sensing means 14 can be varied. The faster the oscillating rate, the more continuously the system monitors the temperature. Typical oscillation times are about 1–5 seconds or more.

This system may also be provided with a guard band mechanism device which protects the control means 30 or 34 from unusual or abnormal fluctuations in the second signal 27. This guard band device might include a logic circuit which monitors the second signal and is activated only when the second signal falls outside a certain expected range or band of temperature fluctuation, e.g. plus or minus 20° F. If the second signal 27 should indicate a peak temperature falling outside this band the logic circuit would freeze the control means 30 and/or 34 at their current setting, possibly sound an alarm, and make an adjustment to the peak memory unit 26.

The adjustment to the peak memory unit would depend upon whether the temperatures reflected by the second signal are above or below the expected temperature range. For example, if an obstruction should temporarily enter the area between the sensing means 14 and the moving mass 12, and if that obstruction was at a substantially lower temperature than the temperature of the moving mass, the magnitude of the second signal would continue to decrese at the predetermined decay rate. As soon as the decay rate has reduced the magnitude of the second signal to the boundary of the temperature range guard band, the logic circuit will freeze the control means to prevent their responding to an untrue situation and would dump the memory in the peak memory unit until such time as the output signal 27 returned to a point inside the range of the guard band. If, on the other hand, an object suddenly appeared in the view of the sensing means 14 having a temperature substantially higher than that of the moving mass 12, the magnitude of the output signal 27 would suddenly rise above the upper boundary of the guard band range. When this happened, the logic circuit would freeze the control means to prevent their reacting to this untrue situation and would substantially increase the decay rate of the peak memory unit, e.g. full decay in two seconds or more, until such time as the magnitude of the output signal 27 was back within the guard band range. At that point the logic circuit would return the decay rate to its normal rate and permit the control means to respond to the second signal 27.

It can be readily appreciated that the above described method and system overcomes the problems previously encountered in prior art attempts to monitor the temperature of a continuous moving mass. Thus, regardless of where the peak temperature of the moving mass is within the boundaries of the moving mass it will be detected on each half cycle of oscillation by the above described system and its method of operation. Also, if the moving mass tends to fluctuate somewhat in diameter or direction, the peak temperature will still be within the confines of the area across which the segment that the sensing means sees is oscillated. Finally, even if the sensing means is vibrated, it will not miss the peak temperature because the normal vibrations that might be expected are not sufficient to prevent the sensing means 14 from seeing the moving mass 12 on each half cycle of oscillation.

In describing the invention certain embodiments have been used to illustrate the invention and the practice thereof. However, the invention is not limited to these specific embodiments as other embodiments and modifications within the spirit of the invention will readily occur to those skilled in the art on reading this specification. The invention is thus not intended to be limited to the specific embodiments disclosed, but instead is to be limited only by the claims appended hereto.

What I claim is:

1. A system for monitoring the peak temperature of a mass moving past a given area wherein the peak temperature changes location within the confines of the mass and of said area, comprising:
   a. means for sensing the temperature of a portion of said mass which portion is located adjacent to a segment of said area, said sensing means being spaced from said mass and capable of emitting a first signal having a magnitude representative of the temperature of said mass at said portion, said first signal comprising peaks and valleys and magnitude differences therebeween,
   b. means for oscillating said sensing means and thereby scanning said moving mass such that on each half cycle of oscillation said sensing means scans the peak temperature of the moving mass,
   c. means for receiving said first signal and for generating a second signal that relates to at least the peak magnitude of that portion of said first signal received during each half cycle of oscillation, said receiving and generating means also having means for decaying the magnitude of said second signal at a desired rate between the times that the peak temperatures are sensed in sequential half cycles of oscillation by the sensing means, said second signal having peaks and valleys and magnitude differences therebetween, the magnitude differences of said second signal being much smaller than the corresponding magnitude differences of said first signal.

2. A system as defined in claim 1 further including:
   d. linear converting means for converting said first signal from being related to the sensed temperature to being linearally proportional to the sensed temperature.

3. A system as defined in claim 1 further including:
   d. means for changing the temperature of said moving mass, said temperature changing means being responsive to the magnitude of said second signal.

4. A system as defined in claim 1 further including:
   d. means for controlling the temperature of said moving mass, said control means being responsive to the magnitude of said second signal.

5. A method for monitoring the peak temperature of a mass moving past a given area wherein the peak temperature changes locations within the confines of said mass and adjacent to said area, comprising
   a. placing a temperature sensing means spaced from said moving mass and oscillating said temperature sensing means such that a segment of said area viewed by said temperature sensing means is moved back and forth across the confines of said area which area extends beyond the confines of said moving mass, b. feeding a first signal coming from said sensing means, which signal comprising a series of peaks and valleys with magnitude differences therebetween, into a means for generating a second signal that relates to at least a peak magnitude of that portion of said first signal received during each half cycle of oscillation, and decaying the magnitude of said second signal at a predetermined rate between the times that the peak temperatures are sensed in sequential half cycles of oscillation by the sensing means thereby providing a second signal having peaks and valleys and magnitude differences therebetween, the magnitude differences of the second signal being much smaller than the corresponding magnitude differences of the first signal.

6. A method as defined in claim 5 further including:
c. using said second signal to control heating means heating said moving mass so as to control the temperature of the moving mass within a desired range.

7. A method as defined in claim 5 further including:
c. using the second signal to control temperature changing means to change the temperature of said moving mass to a temperature within a desired range.

* * * * *